(12) United States Patent
Golota et al.

(10) Patent No.: US 9,894,146 B2
(45) Date of Patent: Feb. 13, 2018

(54) DYNAMIC LIGHTING SYSTEM

(71) Applicant: SARGON PARTNERS, Walled Lake, MI (US)

(72) Inventors: Jeffrey Golota, Walled Lake, MI (US); Eric Mohr, Walled Lake, MI (US); Daniel Anthony, Walled Lake, MI (US); Ammar Muhsen, Walled Lake, MI (US); Michael Vartanian, Walled Lake, MI (US)

( * ) Notice: Subject to any disclaimer, the term of this patent is extended or adjusted under 35 U.S.C. 154(b) by 519 days.

(21) Appl. No.: 14/543,366

(22) Filed: Nov. 17, 2014

(65) Prior Publication Data

US 2015/0142714 A1 May 21, 2015

Related U.S. Application Data

(60) Provisional application No. 61/905,634, filed on Nov. 18, 2013.

(51) Int. Cl.
| | |
|---|---|
| G06N 5/02 | (2006.01) |
| H04L 29/08 | (2006.01) |
| H04W 48/16 | (2009.01) |
| H04W 84/18 | (2009.01) |
| H05B 37/02 | (2006.01) |

(52) U.S. Cl.
CPC ............. *H04L 67/10* (2013.01); *H04W 48/16* (2013.01); *H04W 84/18* (2013.01); *H05B 37/0272* (2013.01); *G06N 5/02* (2013.01)

(58) Field of Classification Search
None
See application file for complete search history.

(56) References Cited

U.S. PATENT DOCUMENTS

2013/0104117 A1* 4/2013 Vedantham ............. G06F 8/665
717/172

* cited by examiner

*Primary Examiner* — Wilbert L Starks
(74) *Attorney, Agent, or Firm* — Fishman Stewart PLLC

(57) ABSTRACT

A dynamic lighting system may comprise a base node having a broadcast range, a plurality of lights being operatively associated with a set of basic nodes, and a network brain configured to communicate with the base node and store a node list with the unique identifiers for the set of basic nodes. The set of basic nodes may include local nodes in the broadcast range and remote nodes beyond the broadcast range. The network brain may be configured to send a broadcast message that is communicated to local nodes within the broadcast range and remote nodes beyond the broadcast range.

20 Claims, 14 Drawing Sheets

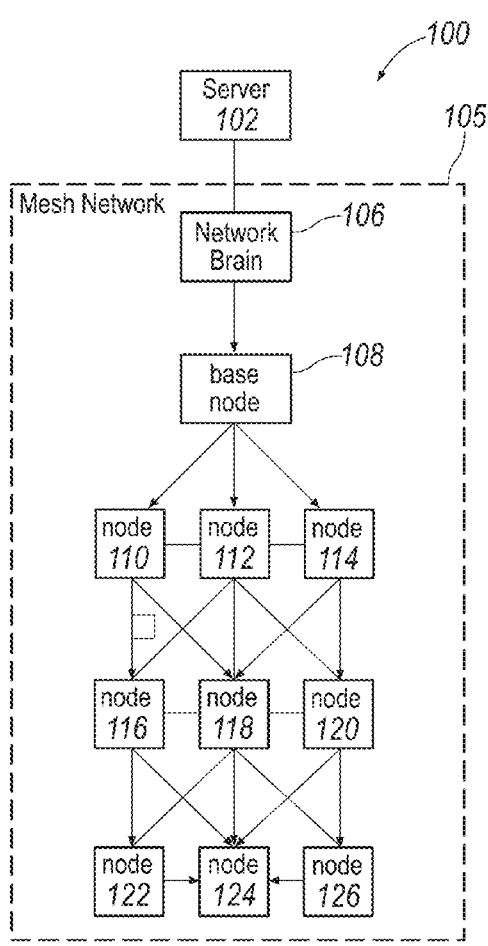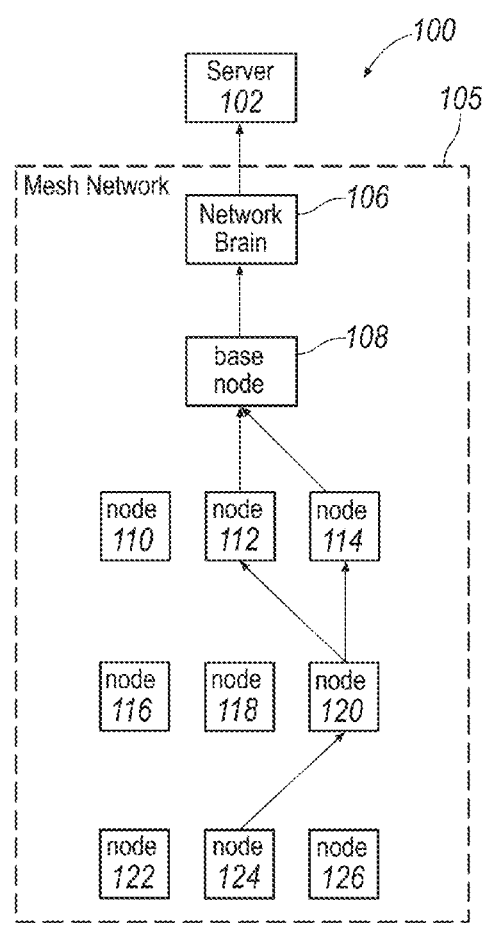
FIG. 1B
FIG. 1C

DYNAMIC LIGHTING SYSTEM

This application is based on and claims priority to U.S. Provisional Patent Application No. 61/905,634, filed Nov. 18, 2013, titled "Automatic Self-Healing Wireless Network with an Arbitrary and Changing Number of Nodes," which is hereby incorporated by reference in its entirety.

BACKGROUND INFORMATION

Field of Technology

The present disclosure relates to networks, and more particularly, but not exclusively, to automatic self-healing networks configured to provide an arbitrary and changing number of nodes. Exemplary embodiments of the present disclosure relate to dynamic lighting systems.

Background

Traditional mesh networks have a number of nodes that relay data throughout the network. Traditional mesh networks may include coordinator nodes to coordinate data across the network. However, coordinator nodes of traditional networks need to be notified and configured each time a node is added or removed from the mesh network. Accordingly, there is a need for a mesh network configured to automatically adapt to an arbitrary or changing number of nodes. In addition, there is a need for a dynamic lighting system utilizing the same.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 1B illustrates an exemplary implementation of a mesh network system, for example, propagating a message from a network brain to a basic node;

FIG. 1C illustrates an exemplary implementation of a mesh network system, for example, propagating a response message from the basic node to the network brain;

DETAILED DESCRIPTION

Figure 1A:
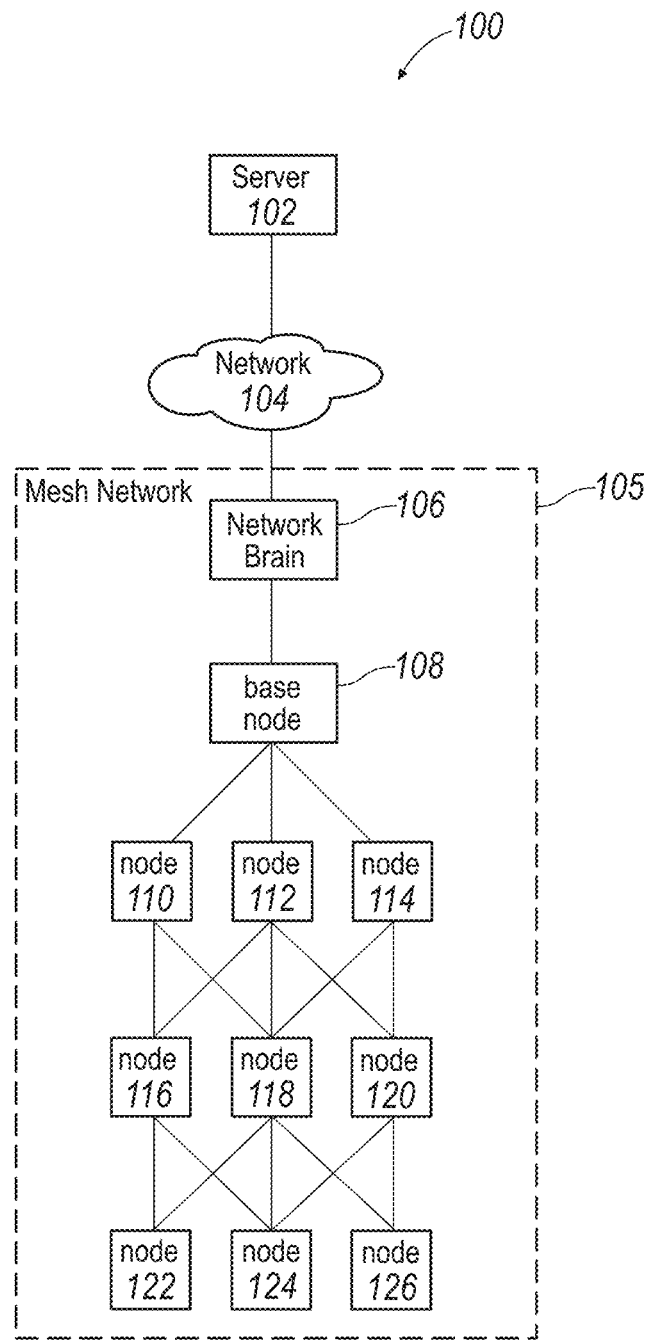
FIG. 1A illustrates an exemplary implementation of a mesh network system.

An exemplary system may include a dynamic lighting system. The system may comprise a base node having a broadcast range, a plurality of lights being operatively associated with a set of basic nodes, and a network brain configured to communicate with the base node and store a node list with the unique identifiers for the set of basic nodes. The set of basic nodes may be in communication with the base node, each node of set of basic nodes having a unique identifier. The set of basic nodes may have local nodes being configured to communicate messages within the broadcast range of the base node and remote nodes configured to relay messages outside the broadcast range of the base node. The network brain may be is configured to send a broadcast message that is communicated to the local nodes in the broadcast range and remote nodes beyond the broadcast range FIG. 1A illustrates an exemplary system 100. The system 100 may include a server 102, a network 104, and a mesh network 105, for example a wireless mesh network. The mesh network 105 may comprise a network brain 106, a base node 108, and a set of basic nodes including basic nodes 110, 112, 114, 116, 118, 120, 122, 124, and 126. The server 102 may include one or a plurality of local, remote, or cloud computing system. The basic nodes 110-126 may communicate to each other with a wired connection, a wireless connection based on a broadcast range of basic nodes 110-126, or a combination thereof. Some of the basic nodes 110-126 may be in communication range with the base node 108 that is in communication with the network brain 106 that uses the network 104 to communicate with the server 102. The network 104 may be connected to one or a plurality of mesh networks 105.

The nodes 110-126 may each include a computing device with memory, a processor, and a transmitter that may communicate, for example, arranged in a peer-to-peer configuration. The communication may utilize one or more wireless communication protocols, for example near field communication (NFC), Wi-Fi, radiofrequency identification (RFID), or any combination thereof. Each of basic nodes 110-126 may have a broadcast range and may be configured to communicate with any other basic nodes in the broadcast range of any of basic nodes 110-126. Basic nodes 110-126 may each have a broadcast range and may wirelessly communicate a data to other nodes based on the broadcast range. For basic nodes separated by a distance greater than the broadcast range of an origination node, the mesh network 105 may utilize one or more intermediary basic nodes that are located physically in-between the origination node and a destination node to relay the message. Nodes in the broadcast range may be referred to as local nodes and nodes outside with broadcast range may be referred to as remote nodes. Each of basic nodes 110-126 may include a unique node identifier, e.g., a Machine Access Code (MAC).

For example, the broadcast range of basic node 110 may include the base node 108, basic node 112, basic node 116, and basic node 118. Given that basic node 110 and basic node 112 are local nodes in the broadcast range, any messages that need to be exchanged between them can be done directly, referred to as local nodes. If node 110 is to communicate with remote nodes beyond the broadcast range, intermediary nodes, for example basic node 118, may relay the message between basic node 110 and basic node 126.

Basic nodes 108-126 may include a power source, for example, any wired or wireless power source. The power source may include an alternating current (AC) power source or a direct current (DC) power source such as a battery. The power source may include wireless power transmission to or between any of nodes 108-126 such as radiofrequency identification (RFID) power transmission, near field communication (NFC) power transmission, or other means of transmitting power to the basic node. In addition, the basic nodes 108-126 may be powered using a mechanical motion or thermal gradient technology. In addition, the basic nodes 110-126 may be operable between a sleep mode to conserve battery power and a wakeup mode to resume power, for example, according to a predefined interval, for example, of approximately 20 seconds. For example, the basic nodes 110-126 may communicate with base node 108 at each predefined interval.

A mesh network 105 may include sensors associated with particular basic nodes. The network brain 106 may issue commands to control individual sensors. The sensors may be configured to respond to requests from the network brain 106, which may relay responses and sensor information to the server 102. The server 102 may make the sensor information available via an internet webpage. Sensors may be added to or removed from the mesh network 105 without reconfiguring the network brain 106. The new sensor can join the mesh network 105 without having to route communication lines or repower to the sensor, which may be advantageous with manufacturing equipment.

More specifically, each of basic nodes 110-126 may be operatively connected to respective sensors. Each sensor may be configured to output sensor information associated with an item attached to equipment or a person. The sensor may include a global positioning system (GPS), a temperature sensor, a humidity sensor, or an accelerometer. The sensor, e.g., the global positioning system (GPS), may indicate sensor information including tracking information regarding the location of each of nodes 110-126. The sensor, e.g., the temperature or humidity sensor, may indicate sensor information including environmental parameters in proximity to the item such as temperature or humidity. The sensor, e.g., the accelerometer, may indicate performance of the item such as how many hours operated, maximum speed of operation, or vibrational characteristics of the item.

The basic nodes 110-126 may be configured to output location information, e.g., a real-time location (RTL). For example, the basic nodes 110-126 may include the sensor (e.g., utilizing GPS) in communication with a cellular communication module. The basic nodes 110-126 may selectively utilize the sleep mode and the wake mode in response to messages being received from other of basic nodes 110-126 after a predetermined time period, for example 1 minute, 20 minutes, 1 hour, or 2 hours. Upon expiration of the predetermined time period, the basic nodes 110-126 may turn on the sensor (e.g., GPS) and the cellular communication module and thereafter send a message to the server 102 e.g., indicating location information.

The base node 108 may include a computing device with memory, a processor, and a transceiver in communication with at least some of the basic nodes 110-126 and the network brain 106. The base node 108 may be a basic node programmed or flagged, e.g., by the network brain 106, to act as a base node 108. The base node 108 may be configured to direct the activities of the system 100. The base node 108 may be responsible for communicating all of the messages from the network brain 106 to the basic nodes 110-126 of the mesh network 105.

The network brain 106 may include a computing device with memory and a processor that may be in communication with the base node 108 and in communication with the server 102 through the network 104. The network brain 106 may maintain information about all of the basic nodes 110-126 in the mesh network 105. The network brain 106 may maintain a node list of basic nodes 110-126 and may periodically check that the basic nodes 110-126 are in communication with the other nodes 110-126.

The network brain 106 may be configured to automatically detect basic nodes that are removed or joined to the mesh network 105. For example, the network brain 106 may send a broadcast message to the basic nodes, but to which only new nodes respond. The network brain 106 may have additional communication capabilities beyond the basic nodes 110-126 and base node 108. For example, the network brain may utilize cellular wireless communication. The network brain 106 may maintain a node list associated with the mesh network 105. The network brain 106 and base node 108 may be remotely utilized from each other or may be integrated into and packaged as a unitary physical unit.

The network 104 may be a cellular wireless network, a Wi-Fi communication network, a wired network, or any communication means that enables communication to the server 102. The network 104 may utilize internet access to communicate with the server 102.

The server 102 may be a local, remote, or cloud computing resource. The server 102 may have an adaptable, undefined, or arbitrary set of computing resources that may be utilized by the system 100. The server 102 may utilize cloud computing resources, remote hardware, or third-party or open-source software. The server 102 may be a physical computer with memory and a processor. The server 102 may have a program and a database having a node list for tracking of basic nodes 110-126 and may be configured for reporting and administrative functions. The server 102 may be in communication with one or a plurality of mesh networks 105.

In general computing systems and/or devices, such as the basic node, the base node, network brain, and server, may employ any of a number of computer operating systems, including, but by no means limited to, the Linux® operating system, the Microsoft Windows® operating system, the Mac OS X and iOS operating systems distributed by Apple Inc. of Cupertino, Calif., or the Android operating system developed by the Open Handset Alliance. Exemplary computing devices may include, without limitation, a PIC18F87J11 available from Microchip, a PIC32MX564L128 from the PIC32 MX5xx family of chips available from Microchip, or any other processor, computer chip, or computing system and/or device.

Computing devices generally include computer-executable instructions, where the instructions may be executable by one or more computing devices such as those listed above. Computer-executable instructions may be compiled or interpreted from computer programs, created using a variety of programming languages and/or technologies, including, without limitation, and either alone or in combination, Java™, C, C++, C#, Visual Basic, Java Script, Perl, Python, PHP etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB drive any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Databases, data repositories or other data stores described herein, may include various kinds of mechanisms for storing, accessing, and retrieving various kinds of data, including a hierarchical database, a set of files in a file system, an application database in a proprietary format, a relational database management system (RDBMS), or a no-SQL database. Each such data-store in general runs on a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language.

FIG. 1B illustrates an exemplary implementation of system 100, for example, propagating a message from the network brain 106 to basic nodes 110-126. The message originates in the network brain 106 and is targeted to a basic node by the network brain 106. For example, the network brain 106 may target, designate, or call out basic node 124. The network brain 106 gives the message to the base node 108 that sends it to a basic node in the broadcast range, e.g., basic nodes 110, 112, and 114. Each of those nodes communicates the message to other nodes in their respective broadcast ranges until the reaches a targeted basic node, e.g., basic node 124. The message may contain information about the targeted basic node. As the message propagates through the mesh network 105, it may be limited in replication based on information contained in the message. For example, the replication may be limited based on how much time has elapsed since it was transmitted, how many times a message has been repeated by a basic node, if the basic node has seen the message before, if the current time is passed an expiration time contained in the message, or any other information that can be used to limit the propagation of the message. Each basic node stores information about the base node 108, for example, a unique base node identifier.

FIG. 1C illustrates an exemplary implementation of system 100, for example, propagation of a response message from the basic node, e.g., illustrated as basic node 124, to the network brain 106. Basic node 124 may send a response message back to the network brain 106, by sending the message to all of the basic nodes within the broadcast range of basic node 124, wherein each of those nodes in turn will broadcast the response message to the basic nodes that are in their respective broadcast range. As shown, the response message may take a route from basic node 124 to basic node 120 to both basic node 112 and 114 to the base node 108, which sends the response message to the network brain 106. Thus, communication of messages on the mesh network 105 may be redundant to facilitate the delivery of messages. If the network brain 106 fails to receive a response message, then it may determine that the basic node and any item associated therewith have left the broadcast range of all the nodes in the mesh network 105.

Figure 2:
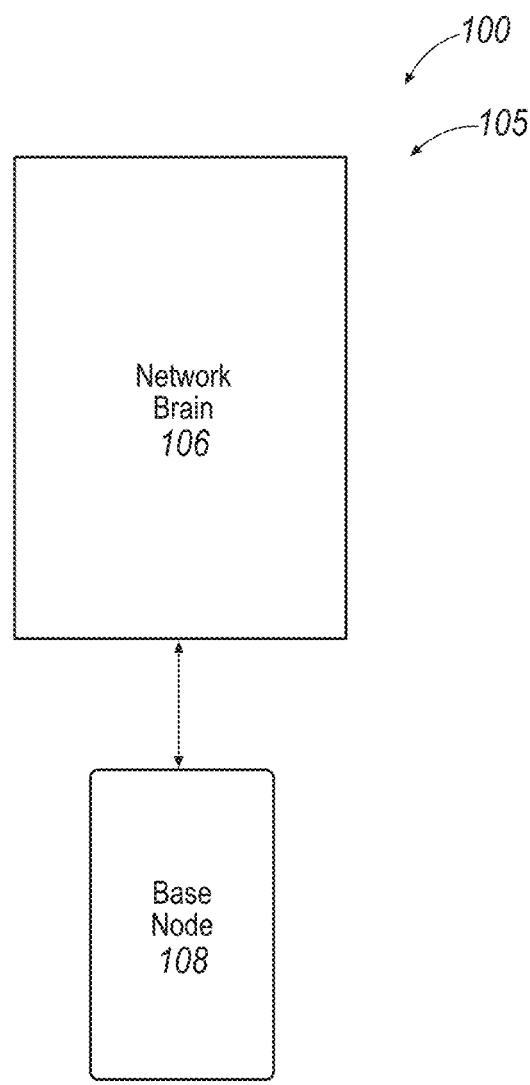
FIG. 2 illustrates a network brain and a base node.

FIG. 2 illustrates another exemplary system 100, for example, having the network brain 106 and the base node 108. The network brain 106 may perform a portion or all of the computations of the mesh network 105. The network brain 106 may store, e.g., using the memory, information about the basic nodes. The computations performed by the network brain 106 may reduce the computational load on the base nodes thereby increasing the operational efficiency of the mesh network 105.

Figure 3A:
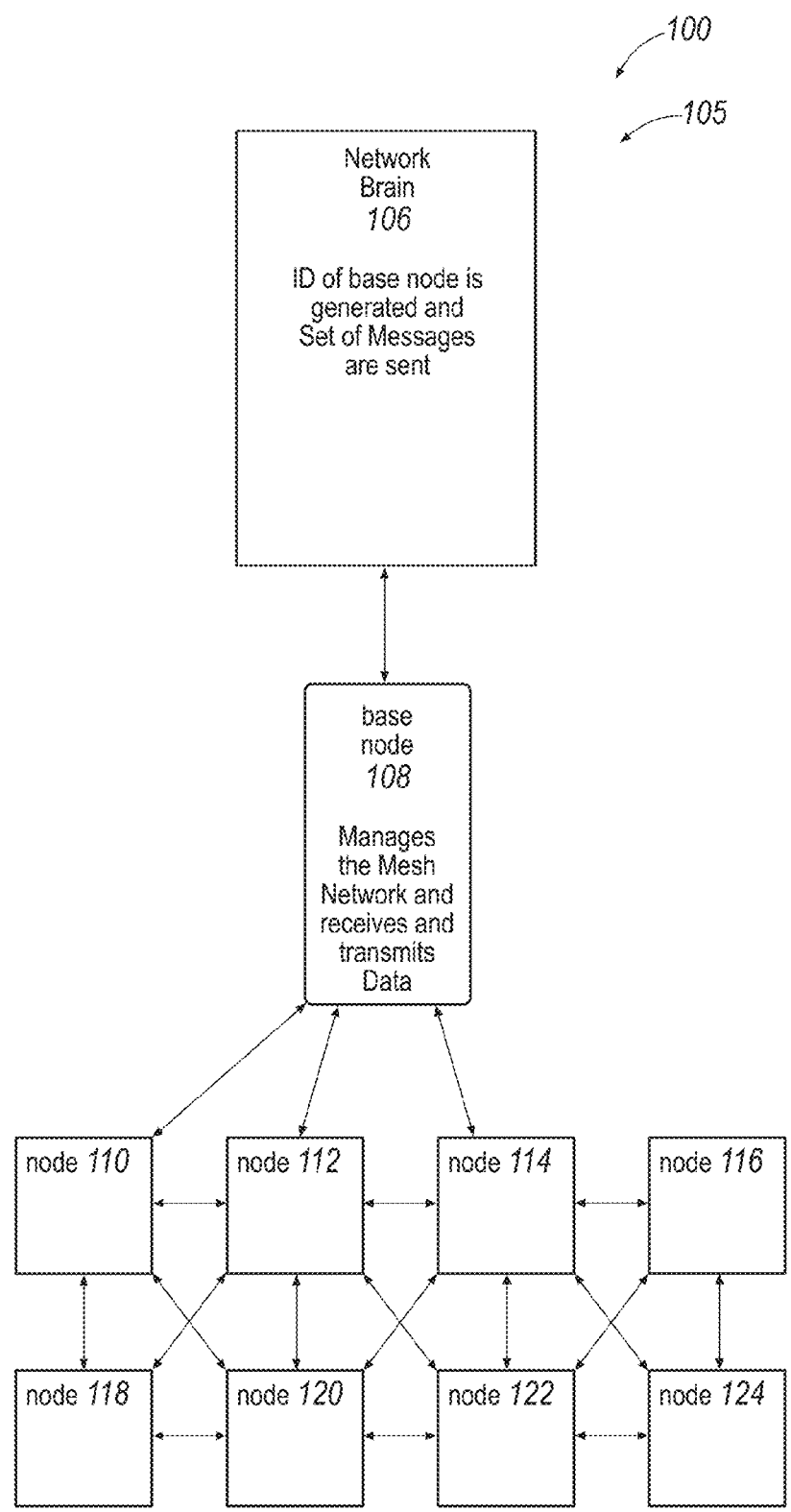
FIG. 3A illustrates a wireless mesh network showing how the network brain communicates to the basic nodes through the base node.

FIG. 3A illustrates another exemplary system 100, for example, having the network brain 106, the base node 108, and the basic nodes 110-124. The network brain 106 may identify a node identifier associated with a target base node 108. The network brain 106 may send one or a set of messages to the base node 108. The base node 108 may be configured to manage messages sent to and response messages returned from the basic nodes 110-124.

Figure 3B:
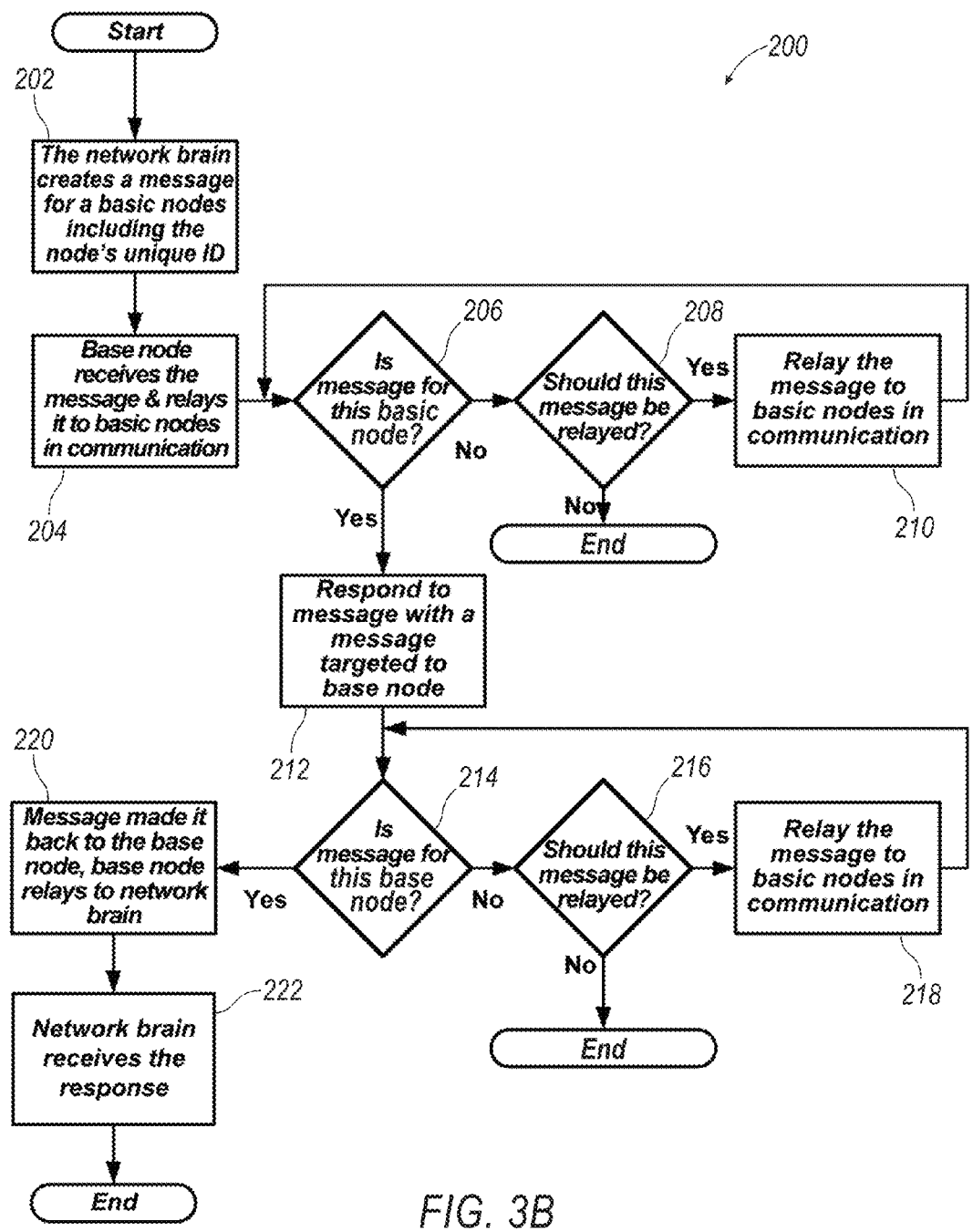
FIG. 3B is a flowchart showing how the network brain messages are relayed to a targeted basic node.

FIG. 3B illustrates a process 200, for example, demonstrating how the network brain 106 communicates with a particular basic node of the mesh network 105. The network brain 106 may utilize process 200 to check every basic node, according to the node list, that is connected to the mesh network.

At block 202, the network brain 106 may communicate a message to a targeted basic node based on the unique node identifier.

At block 204, the base node receives the message and relays the message to the target base node by sending the message through the other basic nodes in communication therewith.

At block 206, when a basic node receives the message, the base node checks to see if that message is addressed to it, for example, based on the target unique identifier contained in the message matching the unique identifier of this basic node.

At block 208, if the message is not for this basic node, the basic node may check to see if it should relay the message. The basic node may determine that it has already relayed this message, so the basic node may do nothing with the message. The message may contain a relay expiration time, and if the basic node receives the message after the relay expiration time than the basic node may do nothing with the message. The message may contain a maximum number of relays for the message including the current relay count. If the current relay count is at the maximum number of relays then the basic node may do nothing with the message. But, if the current relay count is less than the maximum number of relays then the message may increment the current relay count in the message before the message is relayed. The basic nodes may implement these and other means of determining if the message should be relayed.

At block 210, if it is determined that the message should be relayed then the basic node may relay the message to all the other basic nodes within broadcast range.

At block 212, if the message is addressed to this basic node, the basic node may respond appropriately to the request. For example, the basic node may have a temperature sensor and the request may be for the current temperature, in which case the basic node may generate a response message with the current temperature. Similarly, the basic node may respond to a request for humidity, or any other information that a sensor may provide. The request may be for a summary of information, for example, if the basic node is attached to an item that is a device, then the basic node may be configured to report how many hours the device has been operated. Also, if the message is requesting just a response, the basic node will respond, allowing the network brain to know this basic node is still connected to the network and functioning properly.

At block 214, when a base node receives the message, the base node checks to see if that message is addressed to it, for example, based on the target unique identifier contained in the message matching the unique identifier of this basic node.

At blocks 216-218, blocks 208-210 are repeated.

At block 220, a response message returns to the base node 108 and the base node relays the response message to the network brain 106.

At block 222, the network brain 106 receives the response message. After block 222, process 200 ends.

A basic node may be put into sleep mode and wake up periodically, for example, according to the predetermined time period, as discussed above. When each basic node wakes up, the basic node may transmit a message to provide the status to the base node 108 and network brain 106 and then return to the sleep mode. The network brain 106 can send a message to the basic nodes to enter into sleep mode. In addition, a basic node may enter into sleep mode if it does not receive a message within a predetermined time limit, for example, 20 minutes. The sleep mode allows the basic node to conserve battery power.

Figure 4:
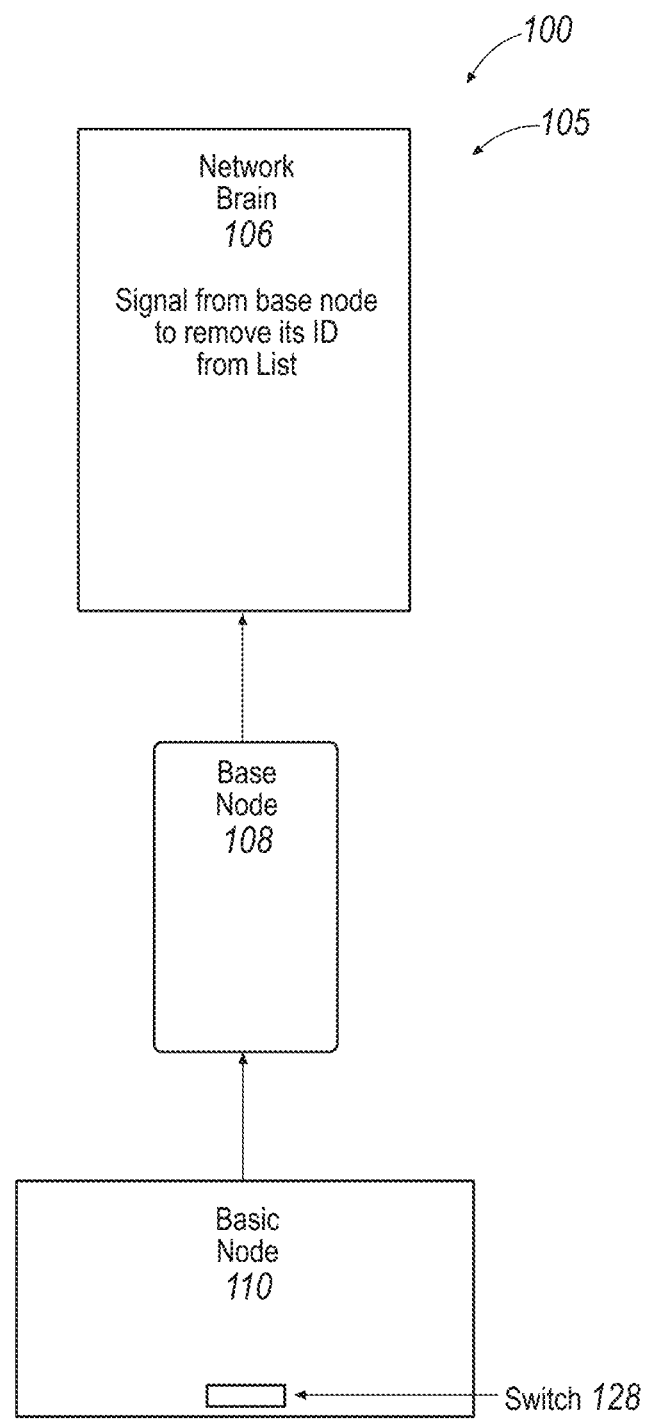
FIG. 4 illustrates a basic node with a switch, for example a deactivation switch.

FIG. 4 illustrates a mesh network with the network brain, the base node 108, and the basic node 110 with a switch 180 such as a deactivation switch. When the deactivation switch is activated, the basic node 110 sends a message to the network brain 106 to inform the network brain 106 that the node 110 has been deactivated. The network brain 106 may then remove the basic node 110 from its node list associated with or part of the mesh network 105. The network brain 106 may also place the unique identifier for that basic node 110 on a blacklist that is not allowed back on the mesh network 105. The deactivation switch may be a button to press on the basic node 110, or it may be a switch activated by the removal of the basic node 110 from the item it was attached to. For example, if the item is a metal item than the switch could be a magnetic switch that on removal from the metal surface will trigger the deactivation switch. Other mechanisms for detecting the removal of the basic node from the item it is tracking could be used, for example, a mechanical switch that has a spring pushing it against the surface and once the item is removed, the spring moves the lever and the switch is activated. The switch may be activated by having a sticky part that attaches to the surface and on removing from the surface then pulls a lever, breaking or making a contact to activate the switch. Any other means could be used that would allow the detection of the removal of the basic node from the tracked item. The deactivated basic node may be recycled and given a new unique identifier. A reduction in voltage may also trigger a deactivation notification. For example, any portion of the system 100 may be configured to detect a light (e.g., LED) not functioning correctly, a cut wire in the system, or loss of power, which may trigger deactivation notifications.

Figure 5:
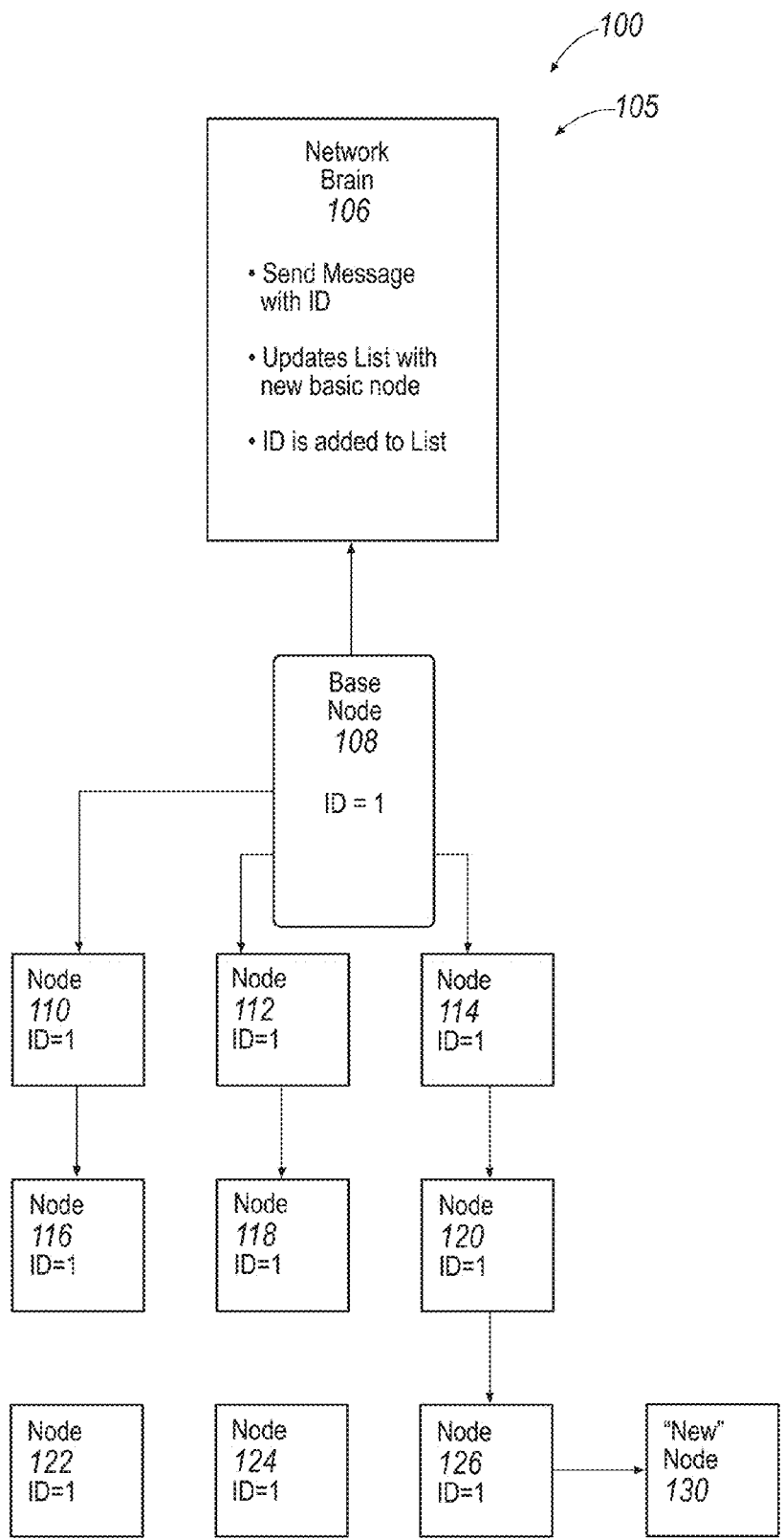
FIG. 5 illustrates a wireless mesh network adding a new basic node.

FIG. 5 illustrates the mesh network 105 adding a new basic node 130. The network brain 106 may send a broadcast message to all the basic nodes with the unique identifier for the base node 108 of the mesh network 105. When a basic node receives the message, the basic node 110 can check the unique identifier for the base node 108 it has stored to see if it matches the broadcast base node. If the two unique identifiers match, the basic node does nothing. If the unique identifiers failed to match, the basic node may send a message to the network brain 106 to identify itself as a new basic node on the mesh network 105, and may update the base node unique identifier stored in the memory of the basic node. On receiving the message, the network brain 106 may update its node list associated with and as part of the mesh network 105. For example, using this method, a previously blacklisted basic node may be reactivated and allowed to rejoin the mesh network 105.

Figure 6:
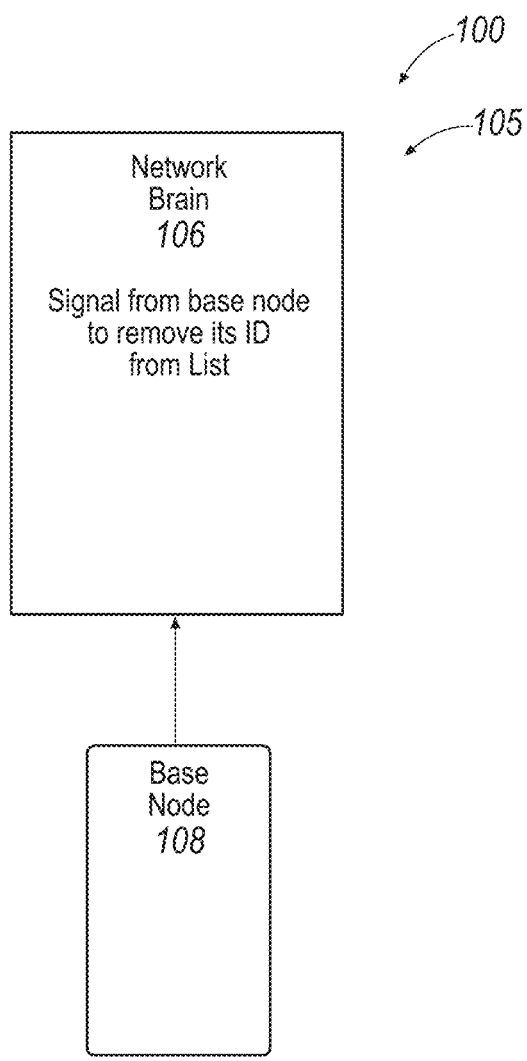
FIG. 6 illustrates a network brain and a base node.

FIG. 6 illustrates the mesh network 105 having the network brain 106 and the base node 108, for example, configured to designate itself the base node. When powered up the base node 108 may communicate to the network brain 106 that it is the base node, and the network brain 106 may add it to the node list as the base node.

Figure 7:
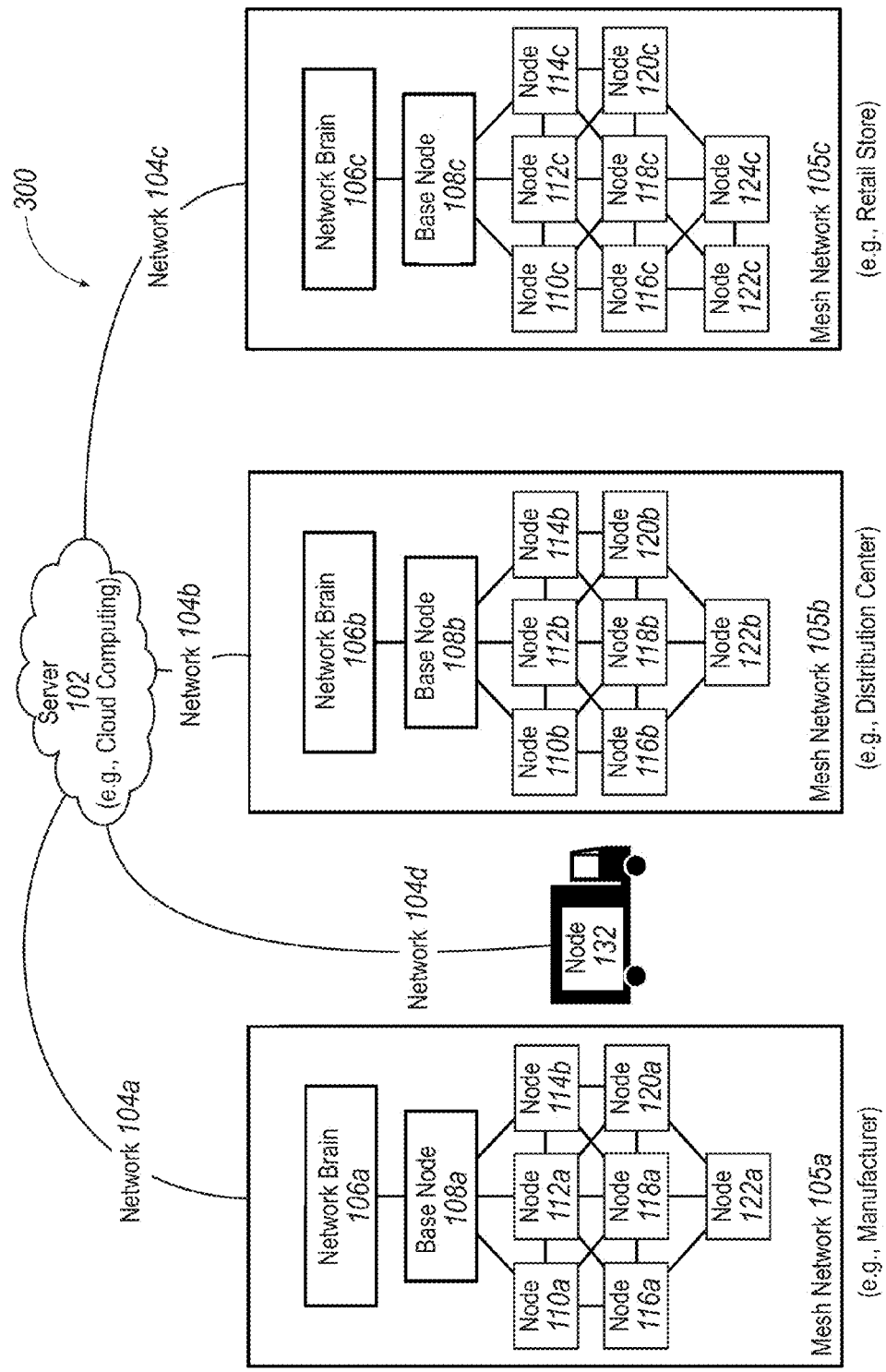
FIG. 7 illustrates a network system having multiple mesh networks.

FIG. 7 illustrates a system 300 including server 102, networks 104a-d, and mesh networks 105a-c, for example, configured for supply chain tracking. Each of mesh networks 105a-c may correspond to a different physical location. A basic node may leave mesh network 105a and, upon arrival at mesh network 105b, may automatically join the mesh network 105b. The server 102 (e.g., cloud computing system) may track the basic node 132, and the item attached to it, through the supply chain. The wireless mesh networks 105a-c may correspond to, for example, a manufacturing plant, a distribution center, and a retail establishment. While in transport, the basic node 132 may not be registered or fixed to any of mesh networks 105a-c. The server 102 may note that the item being tracked is in transition, and may note the transportation route, from and to, based on the mesh networks 105 that the item was associated therewith. Alternatively, a shipping or delivery vehicle or container may include mesh network 105 that is configured to communicate the location of the truck, and its basic nodes to the server 102.

The server 102 may be configured to coordinate and aggregate the data captured from a plurality of network brains 106. In supply chain tracking system, the server 102 may generate notifications to various parties of the supply chain, for example the manufacturer, the distribution center, and the retailer. The notifications may be for payment due, warranty registrations, and reorder points for individual components of the equipment. In addition, the server 102 may maintain information related to individual basic nodes.

To ensure the maintenance of accurate data, the server computer may include a verification process. The verification process may begin by obtaining the node list from the network brains 106 and filtering the data to eliminate duplicate basic node identifiers to arrive at the current scan results. The server 102 may be configured to compare the current scan results to the prior days scan results to determine any missing basic nodes. The location of the basic nodes may be maintained on the server 102. Each basic nodes current location and prior scan results may be maintained by the server 102.

Figure 8:
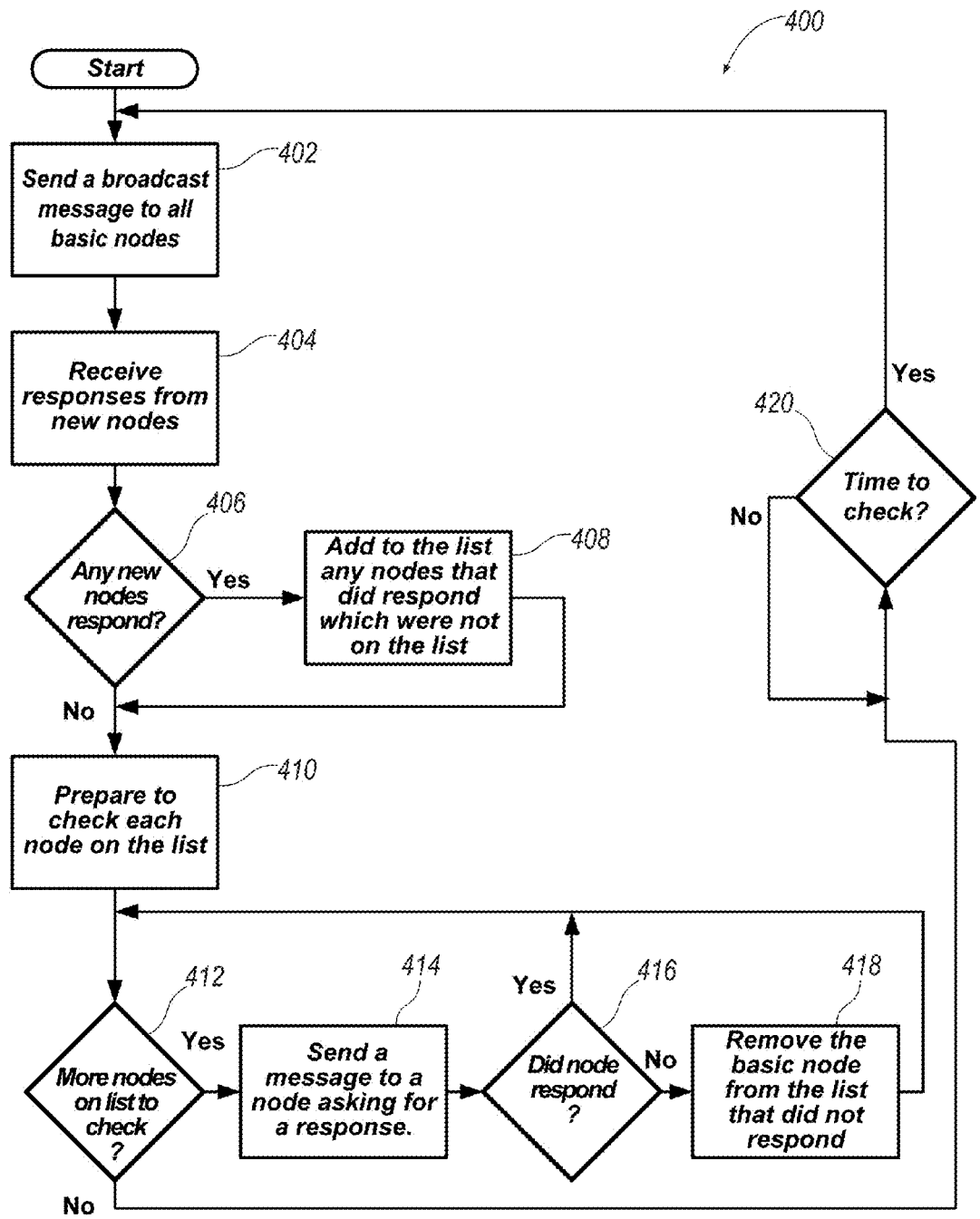
FIG. 8 illustrates an exemplary process, for example, to update a node list of basic nodes.

FIG. 8 illustrates process 400, for example, configured to update a node list.

At block 402, the network brain 106 sends (e.g., periodically) a broadcast message to the basic nodes.

At block 404, the network brain 106 receives responses from new nodes, as discussed above.

At block 406, the network brain 106 may check if any new nodes responded.

At block 408, the network brain 106 may add the new nodes to a node list.

At block 410, the network brain may prepare to check each node on the node list.

At block 412, the network brain 106 may check if there are more nodes on the list to check.

At block 414, the network brain 106 may send a message asking for a response or reply from each node of the node list.

At block 416, the network brain 106 may check if each node responded.

At block 418, the network brain 106 may remove any basic nodes that did not respond from the node list.

At block 420, if the network brain 106 does not receive a reply within a certain amount of time, then the network brain 106 may remove the node from the list.

Figure 9:
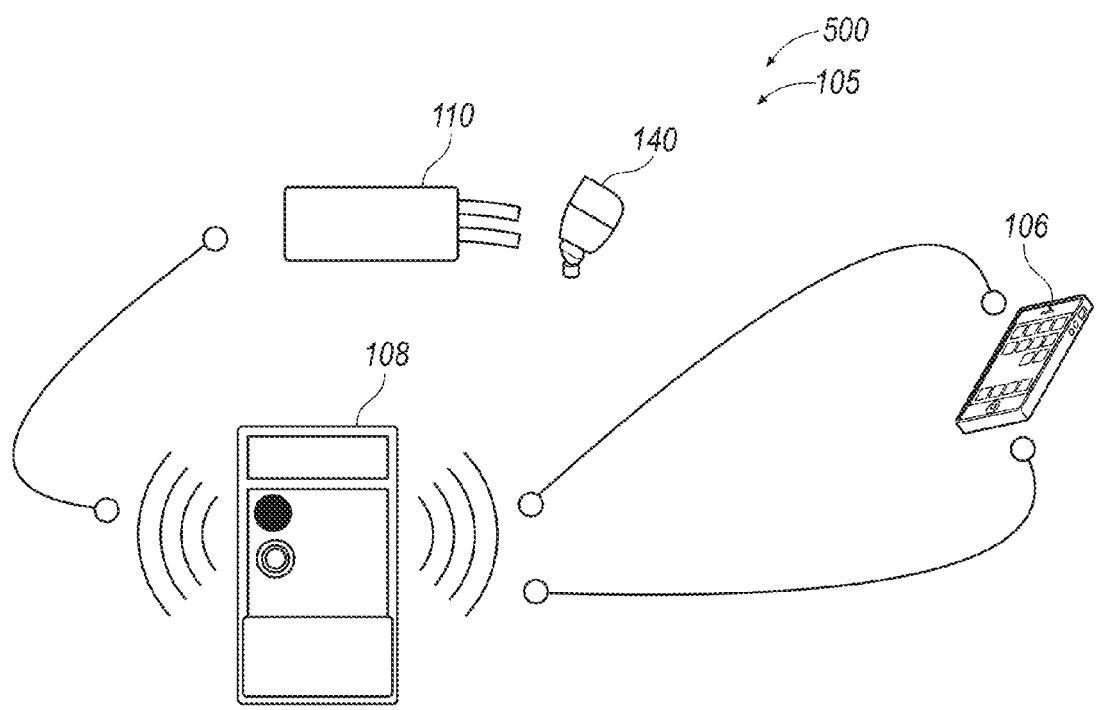
FIG. 9 illustrates an exemplary mesh network, for example, configured as a lighting system.

FIG. 9 illustrates system 500 including a lighting system. System 500 may include the mesh network 105 having the network brain 106, the base node 108, the basic node 110, and a light 140. The light 140 may include a series of lights 140, e.g., light emitting diodes (LEDs). The lights 140 may be configured to be operatively controlled by the basic nodes 110. These basic nodes 110 may be part of the mesh network 105, where the basic nodes 110 may each be operatively connected to respective lights 140. The basic node 110 may be configured to control the power supplied to the light 140. The lights 140 may be capable of producing various shades of color, for example, specifying different amounts of red, green, blue, and white. The network brain 106 may control the individual lights 140. The lights 140 may be configured to be moved and placed in any desired location without limitation of wires for communication so any desired aesthetics may be achieved while reducing setup time. Also, lights 140 may be added to or removed from the mesh network 105 automatically without wiring or any need to notify or configure the mesh network 105 for the additional or fewer lights 140.

Figures 10A, 10B:
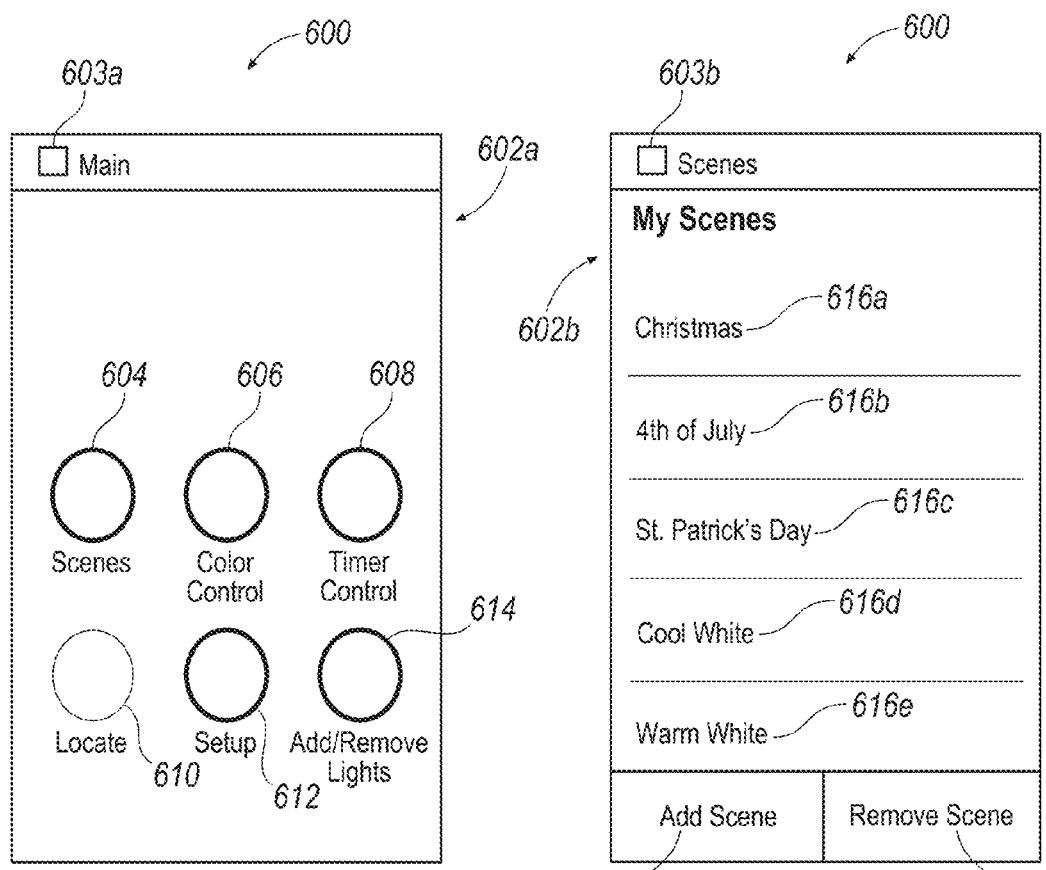
FIGS. 10A, B, C, and D illustrate exemplary user interface screens.
Figures 10C, 10D:
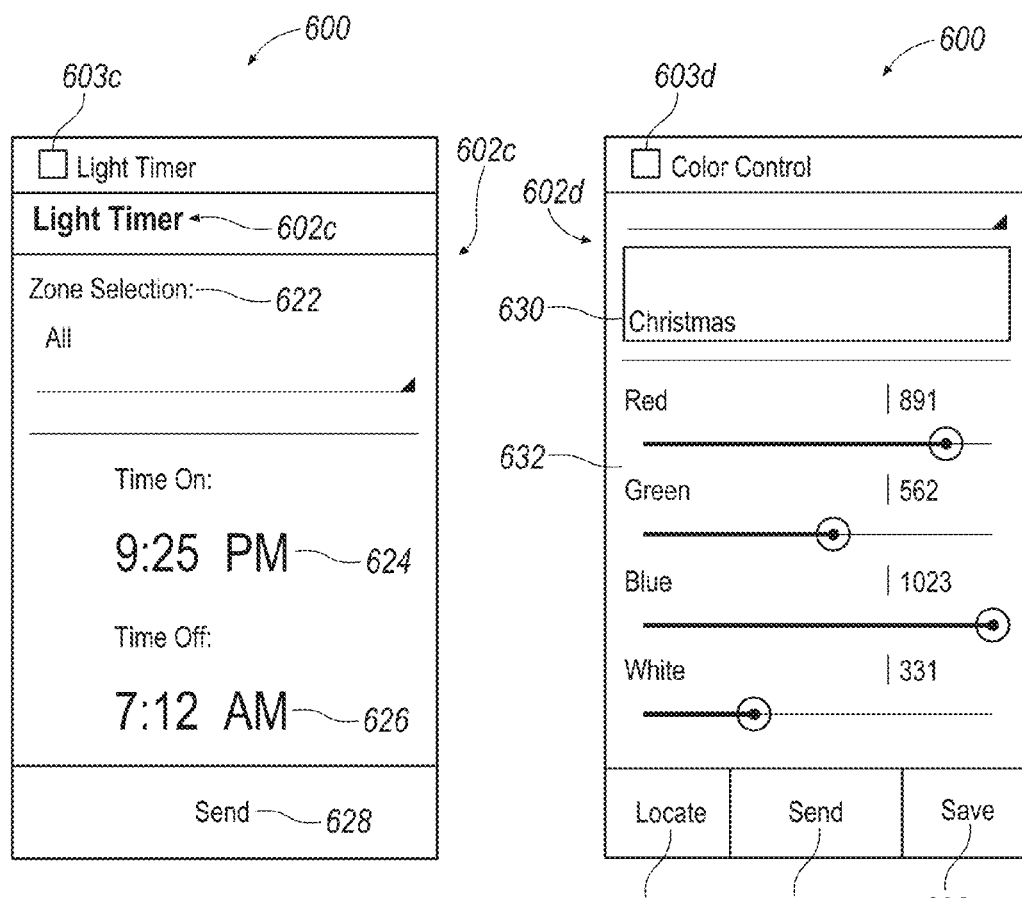

FIGS. 10A-D illustrate system 600 including a user interface, for example, as part of the network brain 106. The system 600 may be configured to set options with respect to lights 140 connected to a set of basic nodes of the mesh network 105. System 600 include main screen 602*a* as shown in FIG. 10A, scenes screen 602*b* as shown in FIG. 10B, light timer screen 602*c*, and color control screen 602*d*. Referring again to FIG. 10A, the main screen 602*a* may include a main screen indicator 603*a*, a scenes button 604 providing a shortcut to the scenes screen 602*b*, a color control button 606 providing a shortcut to the color control screen 602*d*, a timer control button 608 providing a shortcut to the light timer screen 602*c*, a locate button 610 configured to flash a light 140 associated with a selected node, a setup button 612 configured to setup a mesh network 105 having a plurality of lights 140, and an add/remove lights button 614 configured to add or remove nodes associated with lights 140 of the mesh network 105. With reference to FIG. 10B, the scenes screen 602*b* may include a scenes screen indicator 603*b*, any number of scenes 616*a-e*, an add scene button 618, and a remove scene button 620. As shown in FIG. 10C, the light timer screen 602*c* include a light timer screen indicator 603*c*, an on time button 624 configured to set an on time for the lights 140, an off time button 626 configured to set an off time for lights 140, and a send button 628 configured to send selections to the nodes associated with the selected lights 140. Referring to FIG. 10D, the color control screen 602*d* may include a color control screen indicator 603*d*, a selected screen indicator 630, a shade adjustor 632 configured to adjust a color saturation for each light 140, a locate button 634 configured to flash a selected light 140, a second button 636 configured to send a selected color saturation to a light 140, and a save button 638 configured to save the color saturation for application to other lights 140.

Figure 11:
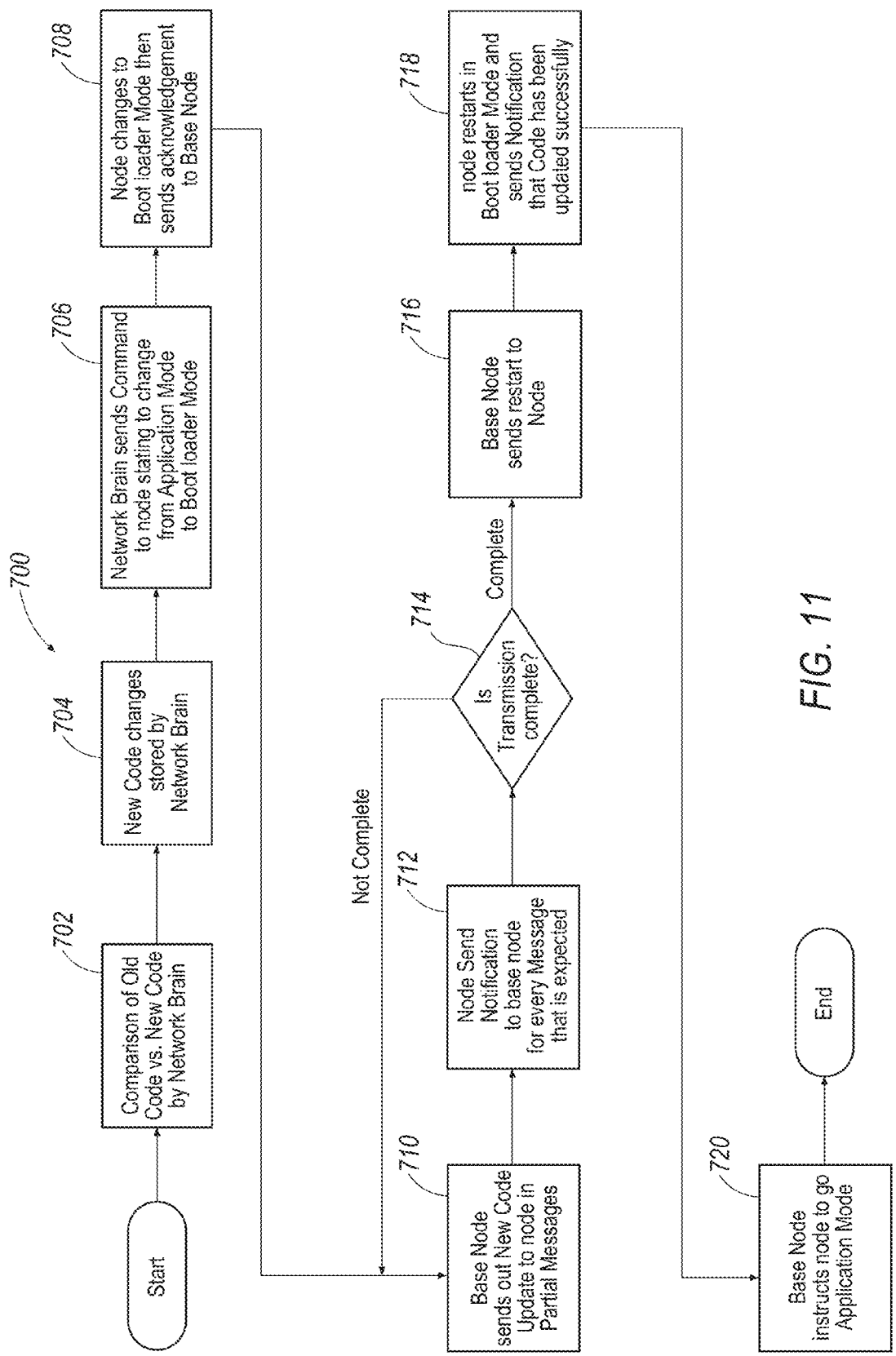
FIG. 11 illustrates an exemplary process of a mesh network, for example, to update code for a set of basic nodes.

FIG. 11 illustrates a system 100 configured to update code (e.g., embedded code) with respect to a set of basic nodes.

At block 702, the network brain 106 may compare old code and new code and identify any code changes.

At block 704, code changes may be stored by the network brain 106.

At block 706, the network brain 106 may send a command to the set of basic node instructing the set of basic nodes to change from an application mode to a boot loader mode.

At block 708, the set of basic node changes to the boot loader mode and sends an acknowledgement to the base node 108.

At block 710, the base node sends a new code update to set of basic nodes, for example, in partial messages.

At block 712, the set of basic nodes sends a notification to the base node 108, for example, for every message that is expected.

At block 714, the base node 108 checks if the transmission is complete. If not complete, the base node 708 continues to send new code updates.

At block 716, the base node 108 instructs the set of basic nodes to restart.

At block 718, the set of basic nodes restart in boot loader mode and sends a notification that the code has been updated.

At block 720, the base node 108 instructs the set of basic nodes to revert to application mode. At block 720, process 700 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method for a dynamic lighting system, the method comprising:
   comparing, using a network brain, an old code with a new code;
   sending, using the network brain, a command to a base node instructing a set of basic nodes to change from an application mode to a boot mode;
   sending, using the base node, a message including the new code to the set of basic nodes;
   updating the new code on the set of basic nodes; and
   changing lighting by instructing the set of basic nodes to change to the application mode.

2. The method of claim 1, wherein comparing includes identifying code changes between the old code and the new code.

3. The method of claim 2, wherein the code changes are stored by the network brain.

4. The method of claim 1, wherein the set of basic nodes is configured to send a response to the network brain after being in the boot mode.

5. The method of claim 1, wherein the network brain is configured to send a notification to the base node for each message that is expected.

6. The method of claim 1, wherein the new code is sent to the basic node in partial messages.

7. The method of claim 1, wherein the basic node is configured to send a message to the network brain after the new code is updated.

8. A dynamic lighting system having a network brain and a base node, the system providing operations comprising:
   compare, using a network brain, an old code with a new code;
   send, using the network brain, a command to a base node instructing a set of basic nodes to change from an application mode to a boot mode;
   send, using the base node, a message including the new code to the set of basic nodes;
   update the new code on the set of basic nodes; and
   change lighting by instructing the set of basic nodes to change to the application mode.

9. The system of claim 8, the operations further comprising identify code changes between the old code and the new code.

10. The system of claim 9, the operations further comprising store, by the network brain, the code changes.

11. The system of claim 8, the operations further comprising send, by the set of basic nodes, a response to the network brain after being in the boot mode.

12. The system of claim 8, the operations further comprising send, by the network brain, a notification to the base node for each message that is expected.

13. The system of claim 8, the operations further comprising send the new code to the basic node in partial messages.

14. The system of claim 8, the operations further comprising send, by the basic node, a message to the network brain after the new code is updated.

15. A non-transitory computer-readable medium tangibly embodying computer-executable instructions, the instructions being executable by a processor to provide operations comprising:
   compare, using a network brain, an old code with a new code;
   send, using the network brain, a command to a base node instructing a set of basic nodes to change from an application mode to a boot mode;
   send, using the base node, a message including the new code to the set of basic nodes;
   update the new code on the set of basic nodes; and
   change lighting by instructing the set of basic nodes to change to the application mode.

16. The medium of claim 15, the operations further comprising identify code changes between the old code and the new code.

17. The medium of claim 16, the operations further comprising store, by the network brain, the code changes.

18. The medium of claim 15, the operations further comprising send, by the set of basic nodes, a response to the network brain after being in the boot mode.

19. The medium of claim 15, the operations further comprising send, by the network brain, a notification to the base node for each message that is expected.

20. The medium of claim 15, the operations further comprising send the new code to the basic node in partial messages.

* * * * *